Patented Aug. 23, 1932

1,873,947

UNITED STATES PATENT OFFICE

ERWIN KRAMER, OF COLOGNE-DEUTZ, BERNHARD BOLLWEG, OF LEVERKUSEN-ON-THE-RHINE, AND LUDWIG ZEH, OF WIESDORF-ON-THE-RHINE, GERMANY, ASSIGNORS TO GENERAL ANILINE WORKS, INC., OF NEW YORK, N. Y., A CORPORATION OF DELAWARE

MANUFACTURE OF SUBSTITUTED SULPHUR DYESTUFFS IN SUBSTANCE OR ON THE FIBER

No Drawing. Application filed October 14, 1929, Serial No. 399,707, and in Germany August 31, 1927.

The present invention relates to new substituted sulphur dyestuffs produced on the fiber and to the fiber dyed therewith.

For the production of our new dyestuffs we use as starting materials the sulphur dyestuffs which are obtainable by reacting upon β-dinaphthol of the formula:

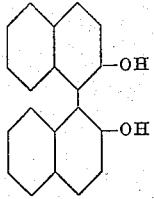

with a sulphurating agent, such as sulphur, a sulphur halogenide and mixtures of sulphur with sulphur halogenides, at a temperature of about 250 to 260° C., which process is more fully described in the U. S. Patent No. 1,759,-264.

We have found that new and valuable substituted sulphur dyestuffs are obtainable by treating the above mentioned starting materials with an alkylating or aralkylating agent including ammonium compounds. Such agents are, for instance, described in the U. S. Patent No. 688,999, namely ethyl bromide, benzyl chloride, dimethyl surfate, dimethylbenzylphenyl ammonium chloride, and the like.

We prefer to carry out the process by dyeing vegetable fibers with the above mentioned starting materials, rinsing the dyed goods and boiling them with a solution of the alkylating or aralkylating agent, for instance, with a solution of dimethylbenzylphenyl ammonium chloride, and preferably in the presence of an agent capable of exerting a reducing action and of a small amount of alkali. By working at a lower temperature or without the addition of a reducing agent the development is retarded and it may, according to the agents used in the subsequent treatment, entirely fail to take place. The dyeings obtained display very satisfactory fastness to boiling and kier boiling.

Our new dyestuffs yield clear red shades of a quality which was not obtainable hitherto by means of sulphur dyestuffs.

The following example illustrates the invention:—

*Example.*—The dyeing obtained on cotton with the sulphur dyestuff, produced from β-dinaphthol by heating the same with sulphur monochloride to 60–100° C. and afterwards, when the vigorous reaction has subsided, at about 250–260° C. for about 4 hours (compare Example 1 of the U. S. Patent No. 1,759,-264) is equeezed and rinsed and then treated for 10–20 minutes in a boiling bath, containing 4 cc. of caustic soda lye (40° Bé.), 1.5 grams of hydro-sulfite and 10 grams of dimethylbenzylphenyl-ammonium chloride per litre. A red dyeing is obtained of excellent fastness to boiling.

By treating in the same manner the dyestuff obtainable by heating β-dinaphthol with a mixture of sulphur monochloride and sulphur to 80 to 100° C. and afterwards at 250 to 260° C. for several hours (compare Example 2 of U. S. Patent No. 1,759,264), a brick red is obtained.

This application is a continuation-in-part of our co-pending application Ser. No. 287,-342, filed on June 21st, 1928.

We claim:

1. As new products the sulphur dyestuffs which are obtainable by treating a sulphur dyestuff, obtainable by sulphuration of β-dinaphthol, with a compounds of the group consisting of alkylating and aralkylating agents, in the presence of a small amount of alkali and an agent capable of exerting a reducing action, the said dyestuffs yielding clear red shades.

2. As new products the sulphur dyestuffs which are obtainable by treating a sulphur dyestuff, obtainable by sulphuration of β-dinaphhol, with dimethylbenzylphenyl ammonium chloride, in the presence of a small amount of alkali and an agent capable of exerting a reducing action, the said dyestuffs yielding clear red shades.

3. As a new product the sulphur dyestuff which is obtainable by treating a sulphur dyestuff, obtainable by heating β-dinaphthol with sulphur monochloride to 60–100° C. and afterwards at 250–260° C. for about 4 hours, with dimethylbenzylphenyl ammonium chloride, in the presence of a small amount of alkali and sodium hydrosulfite, the said dyestuff yielding a clear red shade of excellent fastness to boiling.

4. Vegetable fibers dyed with a sulphur dyestuff claimed in claim 1.

5. Vegetable fibers dyed with a sulphur dyestuff claimed in claim 2.

6. Vegetable fibers dyed with the sulphur dyestuff claimed in claim 3.

In testimony whereof we affix our signatures.

ERWIN KRAMER.
BERNHARD BOLLWEG.
LUDWIG ZEH.